(12) United States Patent
Klobucar

(10) Patent No.: US 7,678,320 B2
(45) Date of Patent: Mar. 16, 2010

(54) ANTI-DROOL MECHANISM FOR A SPRUE BUSHING

(75) Inventor: Peter Klobucar, Georgetown (CA)

(73) Assignee: Mold-Masters (2007) Limited, Georgetown, ON (CA)

(*) Notice: Subject to any disclaimer, the term of this patent is extended or adjusted under 35 U.S.C. 154(b) by 1128 days.

(21) Appl. No.: 11/301,075

(22) Filed: Dec. 12, 2005

(65) Prior Publication Data
US 2007/0132146 A1 Jun. 14, 2007

(51) Int. Cl.
B29C 45/38 (2006.01)

(52) U.S. Cl. ............ 264/328.1; 425/562; 425/563

(58) Field of Classification Search ............ 264/328.1; 425/562, 563
See application file for complete search history.

(56) References Cited

U.S. PATENT DOCUMENTS

| | | | |
|---|---|---|---|
| 3,270,115 A | | 8/1966 | Nouel |
| 3,295,169 A | * | 1/1967 | Moslo ............ 425/563 |
| 3,608,150 A | * | 9/1971 | Laufer et al. ........ 425/543 |
| 4,010,903 A | * | 3/1977 | Sakuri et al. ........ 425/563 |
| 4,136,829 A | * | 1/1979 | Kanao ............ 239/533.1 |
| 4,674,968 A | | 6/1987 | Durst |
| 4,678,427 A | | 7/1987 | Fritzche |
| 4,983,117 A | | 1/1991 | von Buren et al. |
| 5,012,839 A | | 5/1991 | Rogers et al. |
| 5,229,145 A | | 7/1993 | Brown et al. |
| 5,370,523 A | | 12/1994 | Kushnir |
| 5,484,275 A | | 1/1996 | Kushnir |
| 6,793,480 B2 | * | 9/2004 | Dominka ............ 425/563 |
| 7,303,720 B2 | * | 12/2007 | Fairy ............ 264/328.8 |
| 7,396,227 B2 | * | 7/2008 | Nakaya et al. ........ 425/562 |
| 2002/0121713 A1 | | 9/2002 | Moss et al. |
| 2003/0157212 A1 | | 8/2003 | Sicilia |
| 2004/0191357 A1 | | 9/2004 | Babin |

FOREIGN PATENT DOCUMENTS

| | | |
|---|---|---|
| DE | 1554847 | 1/1970 |
| JP | 55-17569 A | 2/1980 |
| JP | 6-23805 * | 2/1994 |
| JP | 6-23806 | 2/1994 |
| JP | 2003-127186 A | 5/2003 |

* cited by examiner

Primary Examiner—Jill L Heitbrink
(74) Attorney, Agent, or Firm—Medler Ferro PLLC

(57) ABSTRACT

A shut-off valve for preventing drool from an injection molding apparatus is provided in a melt channel of a sprue bushing. The shut-off valve includes a fixed member located in the melt channel and a reciprocating member coupled to the fixed member. The reciprocating member is biased toward an extended position in which an inlet of the sprue bushing is blocked thereby. The reciprocating member is movable from the extended position towards a retracted position in which the inlet of the sprue bushing is clear by the force of a melt stream entering the melt channel of the sprue bushing.

11 Claims, 5 Drawing Sheets

ANTI-DROOL MECHANISM FOR A SPRUE BUSHING

FIELD OF THE INVENTION

The present invention relates generally to an injection molding apparatus and, in particular to an anti-drool mechanism for a sprue bushing.

BACKGROUND OF THE INVENTION

Many injection molding systems use a sprue bushing to provide a transfer melt channel between the machine nozzle and a distribution manifold in a mold. In the event that the machine nozzle has to be disengaged from making contact with the sprue bushing, molten plastic will drool backwards from the sprue bushing, and this will adversely affect the next shot of melt. This situation can happen in many applications, such as for example with shuttle molds, rotary molds, and stack molds.

Due to residual pressures in the system, molten material tends to leak, or "drool", from the sprue bushing at the end of the injection cycle, i.e., when the machine nozzle is retracted from the sprue bushing inlet. This drool represents waste material and increased production costs. Further, the drooled material may collect on the mold and prevent complete closing thereof or cause permanent damage thereto.

Many techniques and devices exist in the art that are designed to prevent or reduce drool in an injection molding system. Examples include various shut-off mechanisms located at the machine nozzle tip or spindle elements for use in a "suck-back" procedure. In many cases, the machine nozzle incorporates an anti-drool mechanism into its structure, as is described in U.S. Pat. No. 3,934,626 to Hall, incorporated herein in its entirety by reference thereto.

However, there exists a need to have an anti-drool mechanism that can be added as a modular component to existing injection molding systems, including stack molding systems.

SUMMARY OF THE INVENTION

According to an embodiment of the present invention there is provided an injection molding apparatus which has a sprue bushing with a melt channel for receiving a melt stream of moldable material under pressure. The sprue bushing melt channel has a shut-off valve to prevent melt from drooling between injection cycles.

The shut-off valve includes a fixed member located in the melt channel and a reciprocating member coupled to the fixed member, the reciprocating member being biased toward an extended position in which an inlet of the sprue bushing is blocked by the reciprocating member. The reciprocating member is movable towards a retracted position in which the inlet of the sprue bushing is clear by the melt stream entering the melt channel of the sprue bushing.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
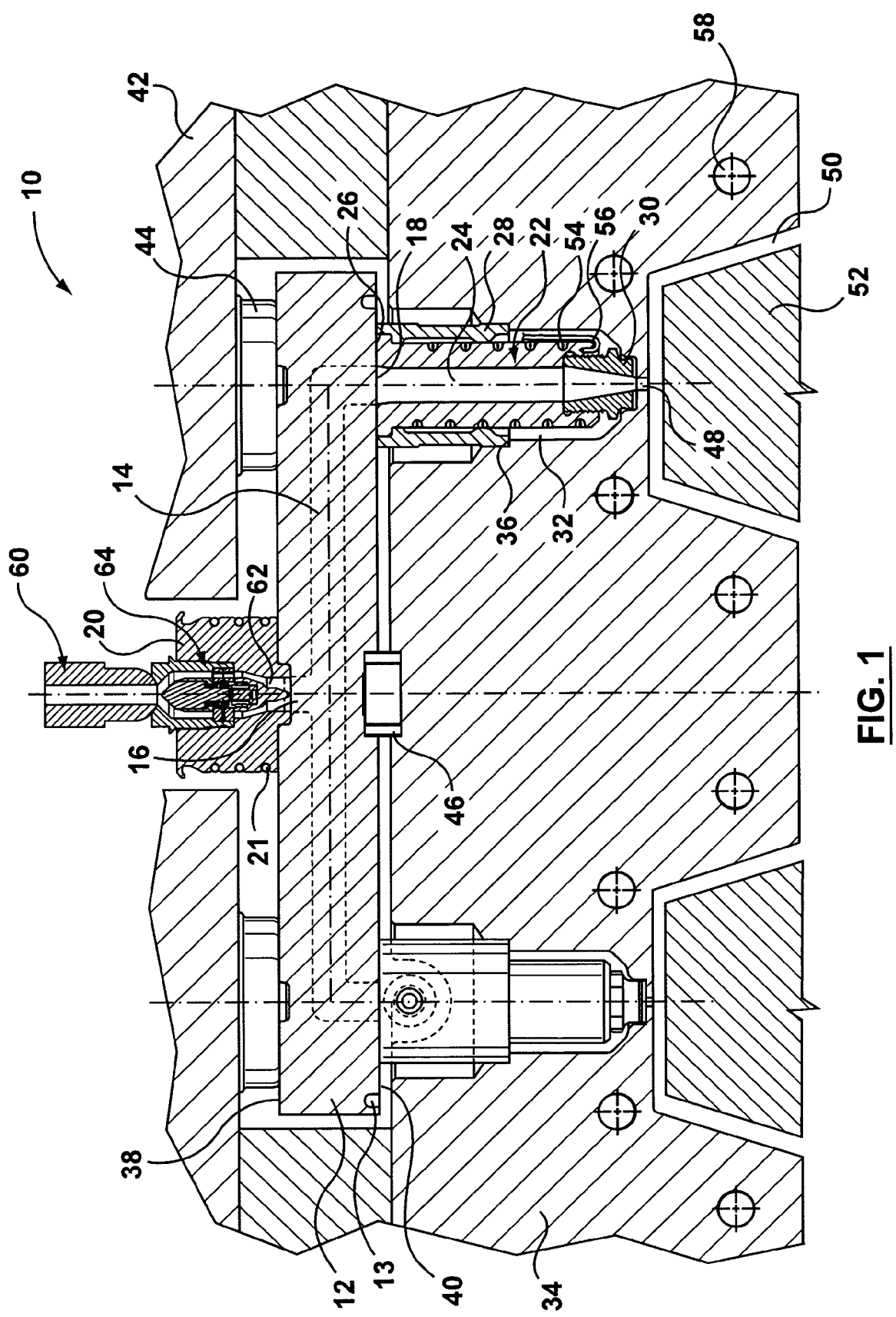
FIG. 1 is a side sectional view of an injection molding apparatus according to an embodiment of the present invention.

Referring now to FIG. 1, an injection molding apparatus 10 is generally shown. Injection molding apparatus 10 includes a manifold 12 having a manifold melt channel 14. Manifold melt channel 14 extends from an inlet 16 to manifold outlets 18. Inlet 16 of manifold melt channel 14 receives a melt stream of moldable material from a machine nozzle 60 through melt channel 62 of a sprue bushing 20 and delivers the melt to hot runner nozzles 22, which are in fluid communication with respective manifold outlets 18. Sprue bushing 20 is heated by heater 21 and manifold 12 is heated by heater 13. The sprue bushing 20 includes a shut-off valve 64, which will be described below. The shut-off valve is generally an anti-drool mechanism for reducing the occurrence of drool when the machine nozzle 60 is de-coupled from the sprue bushing 20.

Although a pair of hot runner nozzles 22 is shown in FIG. 1, it will be appreciated that a typical injection molding apparatus may include only one or a plurality of hot runner nozzles for receiving melt from respective manifold outlets.

Each hot runner nozzle 22 is received in an opening 32 in a mold plate 34. A collar 28 surrounds the nozzle 22. The collar 28 abuts a step 36, which is provided in opening 32 to maintain a nozzle head 26 of the hot runner nozzle 22 in abutment with a lower surface 40 of manifold 12. A nozzle tip 30 is received in a downstream end of hot runner nozzle 22 and is threaded thereto. A nozzle melt channel 24 extends through hot runner nozzle 22 and nozzle tip 30. Nozzle melt channel 24 is in communication with manifold outlet 18 to receive melt from manifold channel 14. Hot runner nozzle 22 is heated by a heater 54 and further includes a thermocouple 56.

A mold cavity 50 is provided between mold plate 34 and a mold core 52. Mold cavity 50 receives melt from nozzle melt channel 24 through a mold gate 48. Cooling channels 58 extend through mold plate 34 to cool mold cavity 50.

Manifold 12 is maintained in position relative to mold plate 34 by a locating ring 46. Spacers 44 are provided between an upper surface 38 of manifold 12 and a back plate 42.

Figure 2:
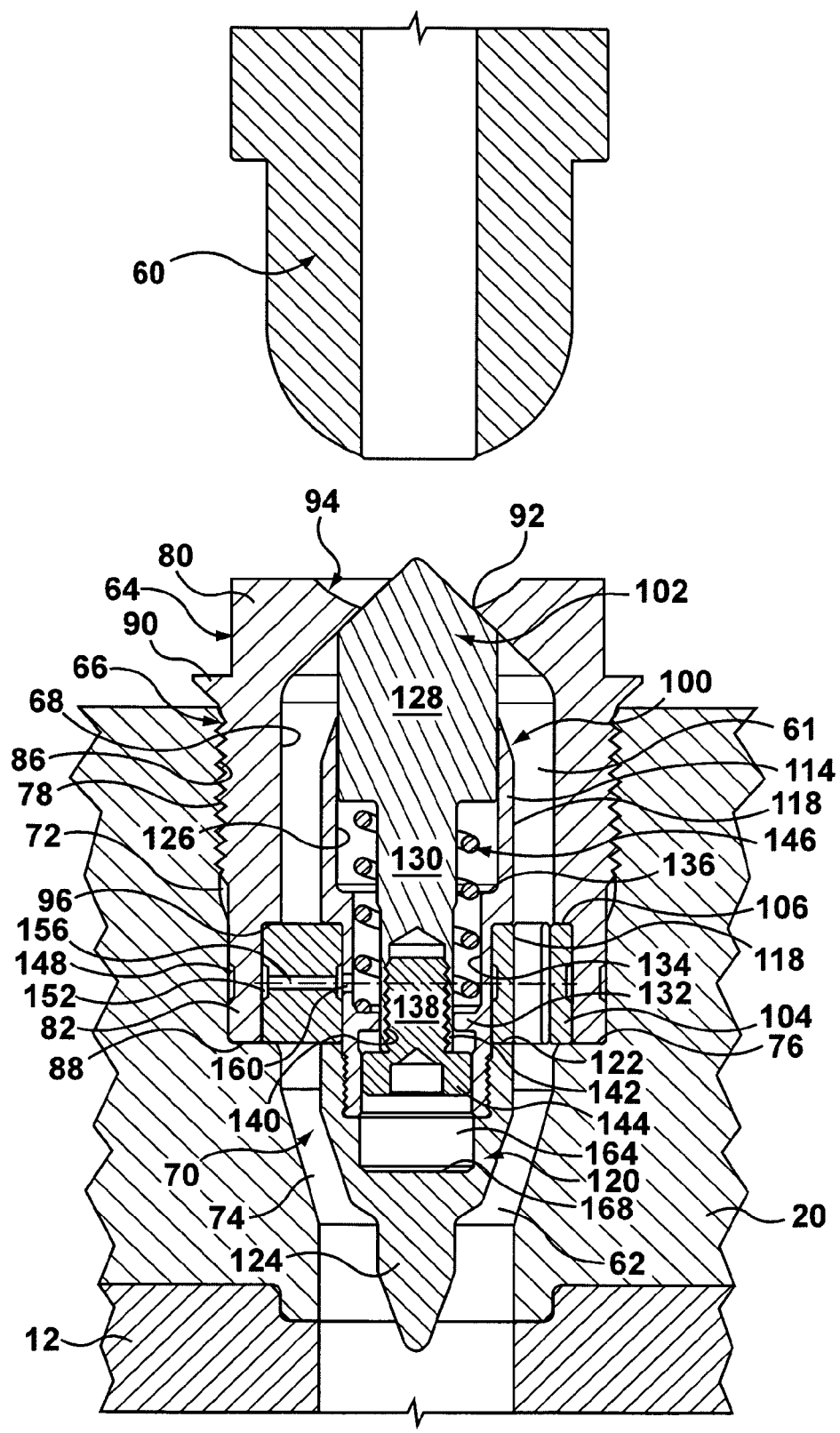
FIG. 2 is a side sectional view of a portion of FIG. 1 showing the shut-off valve in a closed position.
Figure 3:
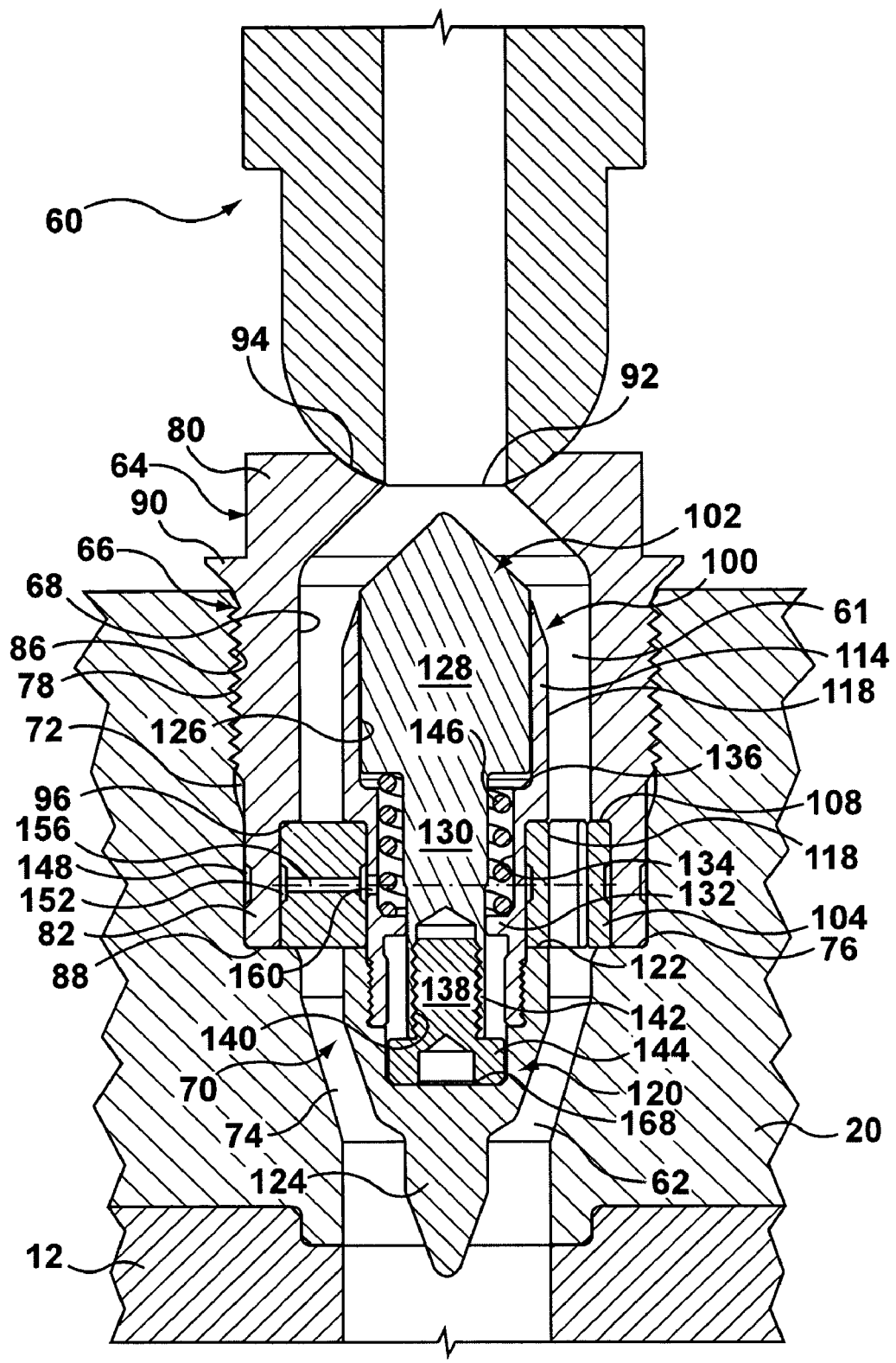
FIG. 3 is a view similar to FIG. 2 showing the shut-off valve in an open position.

Referring to FIGS. 2 and 3, shut-off valve 64 includes a pin retaining assembly 100 having a reciprocating member, which is generally a pin 102. The pin retaining assembly 100 is coupled to an inner wall 68 of a fixed sleeve 66 by a collar 104. The fixed sleeve 66 is received in an upstream portion 72 of bore 70, which extends through sprue bushing 20. The bore 70 includes a shoulder 76 that separates the upstream portion 72 from a downstream portion 74. A shut-off valve melt channel 61 extends around the pin retaining assembly 100 and is delimited by the outer surface of pin retaining assembly 100 and inner wall 68 of fixed sleeve 66. Shut-off valve melt channel 61 is in fluid communication with sprue bushing melt channel 62, which extends within downstream portion 74 of bore 70.

Figure 4:
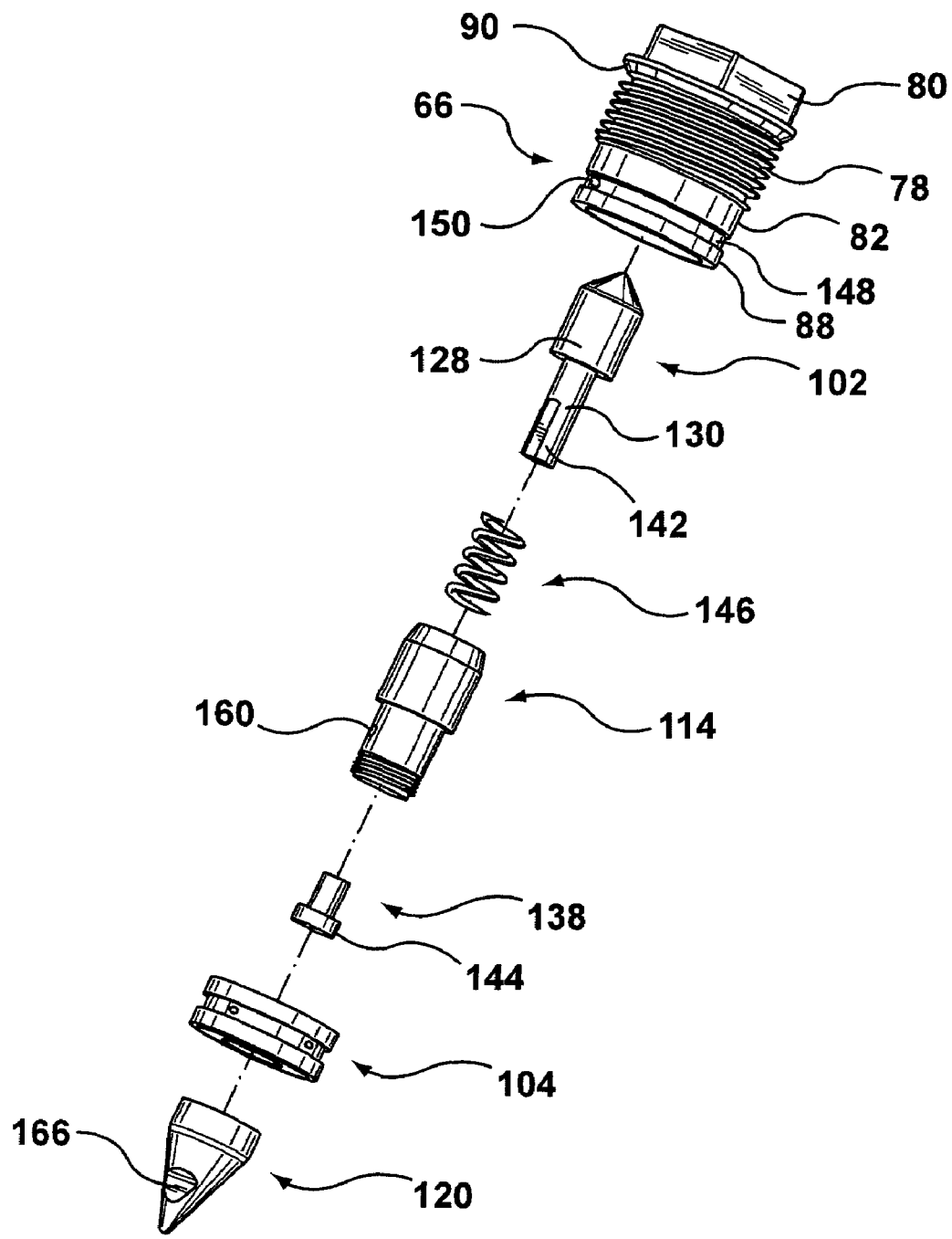
FIG. 4 is an exploded isometric view of the shut-off valve of FIGS. 1-3.

Referring also to FIG. 4, fixed sleeve 66 includes a threaded portion 78 that is provided between a rear end 80 and a forward end 82 thereof. Threaded portion 78 mates with a threaded portion 86 of bore 70. A forward surface 88 of fixed sleeve 66 abuts shoulder 76 of bore 70 in order to locate the fixed sleeve 66 within bore 70. Rear end 80 is shaped to allow for engagement with a tool, for example a wrench, to facilitate installation and removal of the fixed sleeve 66 from the sprue bushing 20. A projection 90 extends outwardly from rear end 80 to act as a stop for the tool.

An inlet 92 extends through rear end 80 of fixed sleeve 66 for receiving melt from machine nozzle 60. A seat 94, which is shaped to mate with the machine nozzle 60, surrounds inlet 92. Fixed sleeve 66 further includes a step 96 that is provided in inner wall 68.

Pin retaining assembly 100 includes a connector 114 having a bore or chamber 126 that extends therethrough. The pin 102 is slidable within the bore or chamber 126 between an extended upstream position, which is shown in FIG. 2, and a retracted downstream position, which is shown in FIG. 3. In the extended, or closed, position, a tapered head 128 of the pin 102 engages the inlet 92 of the fixed sleeve 66 to generally prevent melt flow therethrough. In the retracted, or open, position, the pin 102 is clear of the inlet 92 to allow melt flow therethrough.

A flange 132 extends inwardly from a wall 134 of bore or chamber 126 inside connector 114. The flange 132 is sized to allow a neck 130 of the pin 102 to slide therethrough. A shoulder 136 is provided upstream of the flange 132. A bolt 138 is threadably received in a bore 140 that is provided in a downstream end 142 of the neck 130 of pin 102. A bolt head 144 telescopes within the bore or chamber 126 downstream of the flange 132 as the pin 102 moves between the retracted downstream position and the extended upstream position.

A spring 146 is provided between the tapered head 128 of the pin 102 and the flange 132 to bias the head 128 of the pin 102 towards the extended position. The spring 146 can be any conventional spring known in the art, such as a series of stacked Belleville washers, a helical compression spring, or the like. Spring 146 must have a spring constant sufficient to consistently return pin 102 to the extended position. Spring 146 must also be sufficiently rigorous to withstand a high number of cyclic compressions.

Figure 5:
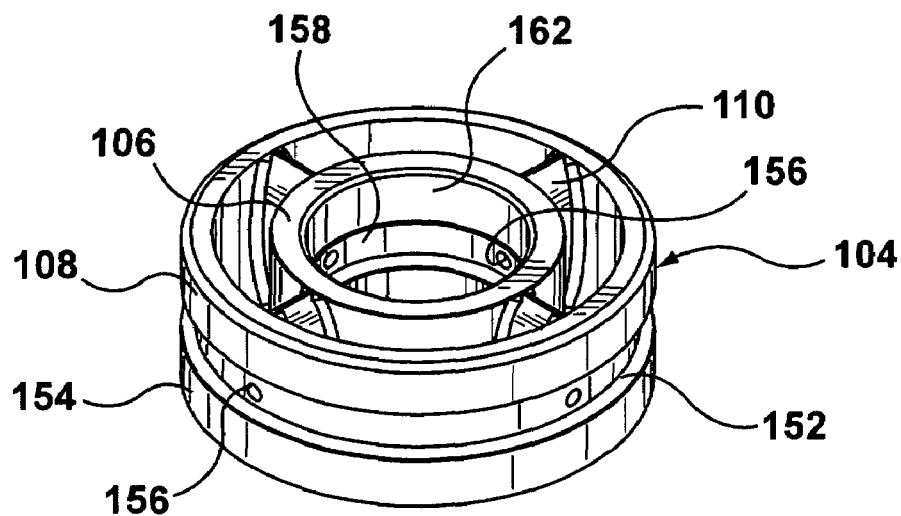
FIG. 5 is an isometric view of a portion of the shut-off valve.
Figure 6:
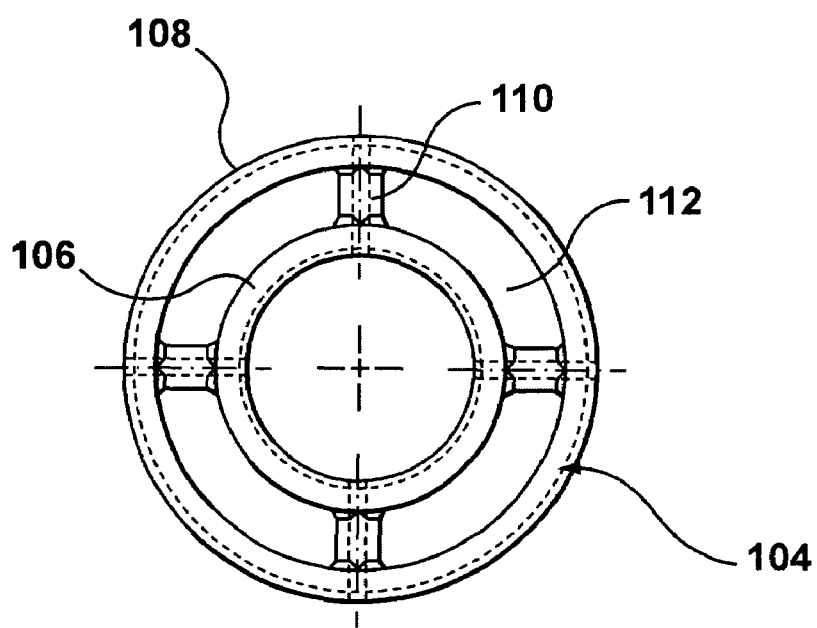
FIG. 6 is a top view of FIG. 5.

With reference to FIGS. 5 and 6, the collar 104, which couples the pin retaining assembly 100 to fixed sleeve 66, includes an internal ring 106 and an external ring 108. The internal ring 106 is coupled to the external ring 108 by a plurality of bridging portions 110. Four separate channels 112 extend between the internal ring 106 and the external ring 108. The channels 112 form part of the melt channel 61 of shut-off valve 64.

The external ring 108 of the collar 104 is sandwiched between step 96 of inner wall 68 of fixed sleeve 68 and shoulder 76 of bore 70 of the sprue bushing 20. The internal ring 106 of the collar 104 is sandwiched between a shoulder 116 that is provided in an outer surface 118 of connector 114 and an end surface 122 of retainer 120. The retainer 120 is threadably coupled to the outer surface 118 of the connector 114 and includes a pin portion 124 that is shaped to facilitate smooth melt flow past the pin retaining assembly 100. The retainer 120 includes a cavity 164 having an end surface 168. Axial movement of the pin 102 into the retracted position is limited by abutment of the bolt head 144 with end surface 168 of cavity 164 of a retainer 120. Pin portion 124 includes flat portions 166 to allow for engagement with a tool, such as a wrench for example, in order to facilitate removal of retainer 120 during disassembly of shut-off valve 64.

The retainer 120 generally prevents melt from entering the cavity 164 thereof. Similarly, the pin 102 is sized to generally prevent melt from entering bore or chamber 126 of connector 114. Melt leakage into these areas could compromise the performance of the shut-off valve 64. Further, disassembly of the shut-off valve may be more difficult.

It will be appreciated by a person skilled in the art that the collar 104 is not limited to having four bridging portions 110. Any number of bridging portions 110 including a single bridging portion 110 or a pair of bridging portions 110 may be used.

A groove 148 is provided in outer surface 98 of the fixed sleeve 66 at forward end 82 thereof. A passage 150 extends through the fixed sleeve 66 to allow groove 148 to communicate with a groove 152 that is provided in an outer surface 154 of the collar 104. Similarly, passages 156 extend through bridging portions 110 of collar 104 to allow groove 152 to communicate with a groove 158 that is provided in an inner surface 162 of the internal ring 106. A passage 160 extends through the connector 114 to allow groove 158 to communicate with bore or chamber 126, which houses the spring 146. The series of grooves 148, 152, 158 and passages 150, 156, 160 is provided to allow air to escape from the spring area when the pin 102 is forced into the retracted downstream position and the spring 146 is compressed.

In operation, machine nozzle 60 is moved into contact with seat 94 of shut-off valve 64 and melt flow from the machine nozzle 60 is initiated. The pressure of the melt stream exiting the machine nozzle 60 forces the pin 102 to telescope within pin retaining assembly 100 and move from the extended position of FIG. 2 to the retracted position of FIG. 3. With the shut-off valve 64 in the open position, melt flows from the machine nozzle 60, through melt channels 61, 62 of shut-off valve 64 and sprue bushing 20, respectively, and into manifold channel 14 of manifold 12. The manifold 12 distributes the melt through manifold outlets 18 to nozzle melt channels 24 of nozzles 22. The melt flows through the nozzle channels 24, past mold gates 48 and into mold cavities 50. Once the mold cavities 50 have been filled, melt flow from the machine nozzle is halted. The relief of the melt pressure allows the pin 102 to return to the extended position under the force of the biasing spring 146. As the tapered head 128 extends, some melt is forced out of melt channel 61 and into the machine nozzle 60. The machine nozzle 60 then performs a "suckback" operation to decompress the melt. Once the pressure of the melt in the machine nozzle 60 drops below a predetermined value, the machine nozzle 60 is disengaged from the shut-off valve 64. The mold cavities 50 are then cooled and the molded parts are ejected from injection molding apparatus 10.

It will be appreciated that the shut-off valve 64 is not limited to being used in injection molding apparatus 10, as shown in FIG. 1. The manifold 12 could distribute the melt stream through manifold channel 14 to other hot runner systems or an injection nozzle, a mold, a stack mold, or a combination of these elements.

In another embodiment, tapered head 128 of pin 102 is biased toward the extended position pneumatically. In this arrangement, the series of grooves 148, 152, 158 and passages 150, 156, 160 are used to conduct compressed air into and out of the connector 114. The tapered head 128 of pin 102 may further be biased toward the extended position hydraulically.

It will be appreciated by a person skilled in the art that the shut-off valve 64 may be retrofitted into a sprue bushing of an existing injection molding apparatus or incorporated into a new sprue bushing of an injection molding apparatus.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
    a sprue bushing having a bore extending there through with a downstream portion defining a melt channel for receiving a melt stream of moldable material under pressure;
    a manifold having a manifold channel for receiving the melt stream from said sprue bushing and delivering the melt stream to a nozzle; and
    a shut-off valve provided in an upstream portion of said sprue bushing bore, said shut-off valve having an inlet for receiving the melt stream from a melt source and a melt channel for delivering the melt stream downstream to said sprue bushing melt channel, said shut-off valve including a pin retaining assembly defining a chamber that accommodates sliding movement of a reciprocating member therein and that contains a biasing member for biasing the reciprocating member in an extended upstream position said pin retaining assembly prevents melt from entering said chamber,
    wherein said reciprocating member is movable between the extended upstream position in which said biasing member biases a head portion of said reciprocating member against said shut-off valve inlet to close said shut-off valve inlet and a retracted downstream position in which said reciprocating member compresses said biasing member and opens said shut-off valve inlet, and wherein the pressurized melt stream acting on said reciprocating member head portion moves said reciprocating member into the retracted downstream position to allow the melt stream to flow downstream around said reciprocating member head portion to thereby enter said sprue bushing melt channel.

2. The injection molding apparatus of claim 1, wherein said reciprocating member is a pin slidable within said chamber of said pin retaining assembly.

3. The injection molding apparatus of claim 2, further comprising:
    a fixed member received in said upstream portion of said bore of said sprue bushing, wherein said pin retaining assembly is concentrically positioned within and coupled to said fixed member.

4. The injection molding apparatus of claim 3, wherein said fixed member is a sleeve received in said upstream portion of said bore of said sprue bushing.

5. The injection molding apparatus of claim 4, wherein said pin retaining assembly is coupled to said sleeve by a collar.

6. The injection molding apparatus of claim 1, wherein said biasing member is a spring.

7. A method of operating an injection molding apparatus comprising:
    providing a shut-off valve in a bore of a sprue bushing, said shut-off valve including a pin retaining assembly defining a chamber that accommodates sliding movement of a reciprocating member therein and that contains a biasing member for biasing the reciprocating member in an extended upstream position to close an inlet of said shut-off valve said pin retaining assembly prevents melt from entering said chamber;
    moving a melt source into contact with said inlet of said shut-off valve;
    injecting a melt stream of moldable material under pressure from said melt source, the pressurized melt stream acting on a head portion of said reciprocating member to move said reciprocating member to a retracted downstream position to allow the melt stream to flow downstream around said reciprocating member head portion and open said shut-off valve inlet thereby permitting the melt stream to flow through a melt channel of said shut-off valve into a downstream melt channel of said sprue bushing and into a manifold, which is in fluid communication with a mold cavity;
    halting injection of the melt stream to thereby relieve the pressure of the melt stream on said reciprocating member head portion to allow said reciprocating member to return to the extended upstream position and close said shut-off valve inlet; and
    moving said melt source out of contact with said inlet of said shut-off valve.

8. The method of claim 7, wherein said melt source is a machine nozzle.

9. The method of claim 8, wherein said reciprocating member is a pin, said pin being received in said pin retaining assembly.

10. The method of claim 9, wherein said pin retaining assembly is coupled to a fixed member that is received in said bore of said sprue bushing.

11. The method of claim 10, wherein said fixed member is a sleeve.

* * * * *